United States Patent [19]

Gergen et al.

[11] Patent Number: 4,797,447

[45] Date of Patent: Jan. 10, 1989

[54] IMPACT RESISTANT BLENDS OF THERMOPLASTIC POLYESTERS AND MODIFIED BLOCK COPOLYMERS

[75] Inventors: William P. Gergen, Houston; Robert G. Lutz, Spring, both of Tex.

[73] Assignee: Shell Oil Company, Houston, Tex.

[21] Appl. No.: 766,216

[22] Filed: Aug. 16, 1985

[51] Int. Cl.[4] .................. C08L 67/02; C08L 53/02
[52] U.S. Cl. ..................... 525/92; 525/314; 525/337; 525/153; 525/154; 525/106; 525/343; 525/366; 525/374; 525/379; 525/383; 525/385
[58] Field of Search ................ 525/92, 366, 250, 271, 525/314

[56] References Cited

U.S. PATENT DOCUMENTS

| | | | |
|---|---|---|---|
| 2,465,319 | 3/1949 | Whinfield et al. | 260/75 |
| 3,047,539 | 7/1962 | Pengilly | 260/75 |
| 3,113,986 | 12/1963 | Breslow et al. | 260/683.9 |
| 3,251,905 | 5/1966 | Zelinski | 260/879 |
| 3,259,607 | 7/1966 | Cherdron et al. | 260/78.3 |
| 3,265,765 | 8/1966 | Holden et al. | 260/876 |
| 3,299,171 | 1/1967 | Knobloch et al. | 260/857 |
| 3,390,207 | 6/1968 | Moss et al. | 260/879 |
| 3,579,489 | 5/1971 | Wagner | 260/78.3 |
| 3,598,887 | 8/1971 | Darcy et al. | 260/879 |
| 3,639,521 | 2/1972 | Hsieh | 260/880 |
| 4,119,607 | 10/1978 | Gergen et al. | 525/92 |
| 4,208,356 | 6/1980 | Fukawa et al. | 525/89 |
| 4,219,627 | 8/1980 | Halasa et al. | 525/89 |
| 4,226,952 | 10/1980 | Halasa et al. | 525/192 |
| 4,426,495 | 1/1984 | Vitus et al. | 525/92 |
| 4,436,865 | 3/1984 | Beever | 525/92 |
| 4,650,828 | 3/1987 | Dean | 525/92 |
| 4,657,970 | 4/1987 | Shiraki et al. | 525/92 |

*Primary Examiner*—Wilbert J. Briggs, Sr.

[57] ABSTRACT

The present invention relates to an impact resistant polymeric composition comprising a polyester and a thermally stable modified selectively hydrogenated high 1,2 content block copolymer wherein at least one graftable functional molecule is grafted to the block copolymer in the vinylarene block.

34 Claims, No Drawings

IMPACT RESISTANT BLENDS OF THERMOPLASTIC POLYESTERS AND MODIFIED BLOCK COPOLYMERS

BACKGROUND OF THE INVENTION

Thermoplastic polyesters, such as poly(1,4-butylene terephthalate) (PBT) and poly(ethylene terephthalate) (PET), are a class of materials which possess a good balance of properties comprising strength and stiffness which make them useful as structural materials. However, for a particular application, a thermoplastic polyester may not offer the combination of properties desired, and therefore, means to correct this deficiency are of interest.

One major deficiency of thermoplastic polyesters is their poor resistance to impact. A particularly appealing route to achieving improved impact resistance in a thermoplastic is by blending it with another polymer. It is well known that stiff plastics can often be impact modified by addition of an immiscible low modulus rubber. However, in general, physical blending of polymers has not been a successful route to toughen thermoplastic polyesters. This is due to the poor adhesion immiscible polymers typically exhibit with each other. As a result, interfaces between blend component domains represent areas of severe weaknesses, providing natural flaws which result in facile mechanical failure.

It is well known to those skilled in the art that hydrogenated block copolymers of styrene and butadiene possess many of the properties which are required for impact modification of plastics. They have a low glass transition, low modulus rubber phase which is required for toughening. Because they contain little unsaturation, they can be blended with high processing temperature plastics without degrading. In addition, they are unique compared to other rubbers in that they contain blocks which are microphase separated over application and processing conditions.

This microphase separation results in physical cross-linking, causing elasticity in the solid and molten states. Such an internal strength mechanism is often required to achieve toughness in the application of plastic impact modification. In addition, melt elasticity of the block copolymer during processing can, under the right conditions, enable it to be finely dispersed with another polymer in a stable interpenetrating co-continuous phase structure. A stable, fine dispersion is desirable in a rubber modified plastic.

Proof that hydrogenated block copolymers of styrene and butadiene are useful plastic impact modifiers can be seen in their widespread use for modifying polyolefins and polystyrene. For these blends, interfacial adhesion is great enough to achieve toughening.

Although the hydrogenated block copolymers do have many of the characteristics required for plastic impact modification, they are deficient in modifying many materials which are dissimilar in structure to styrene or hydrogenated butadiene. Blends of the hydrogenated block copolymer with dissimilar plastics are often not tough due to a lack of interfacial adhesion.

A route to achieve interfacial adhesion between the hydrogenated block copolymer and a dissimilar material is by chemically attaching to the block copolymer functional moieties which interact with the dissimilar material. Such interactions include chemical reaction, hydrogen bonding, and dipole-dipole interactions.

It has previously been proposed to increase the impact strength of polyesters by adding a modified block copolymer. For example, Shiraki et al in International Kokai Application No. WO83/00492 disclose blends of thermoplastic polyester with a modified block copolymer. Specifically, the block copolymer is a partially hydrogenated monovinyl aryl/conjugated diene to which is attached anhydride moieties by the so-called "ENE" reaction. Such modified block copolymers contain functional moieties only in the diene block, unlike the present invention. In addition, such modified block copolymers are deficient because the ENE reaction depends on unsaturation in the base polymer for reaction sites. A reasonable amount of residual unsaturation must be present in order to obtain an advantageous degree of functional moieties onto the base polymer. Since the ENE reaction cannot be carried out so that all double bonds on the base polymer are scavenged, the result of such a process is a modified block copolymer which contains too high a level of unsaturation for successful impact modification of high processing temperature thermoplastic polyesters.

The 'ENE' process as described in the prior art results in a modified polymer product which is substituted at a position on the polymer backbone which is allylic to the double bond. The reaction can be shown for maleic anhydride as follows:

(a) to main chain unsaturation

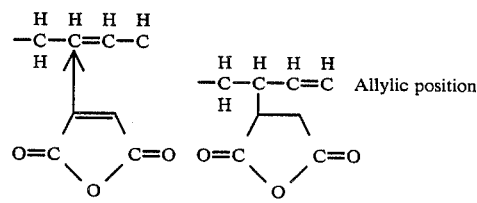

(b) to vinyl unsaturation

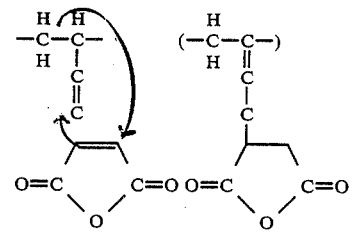

wherein (a) represents addition across a double bond in the main chain of the base polymer and (b) represents addition across a double bond occuring in a side chain. After addition and isomerization the substitution is positioned on a carbon allylic to the double bond.

SUMMARY OF THE INVENTION

According to the present invention, there is provided an impact resistant blend of a thermoplastic polyester and a thermally stable modified selectively hydrogenated high 1,2 content monovinyl aromatic/conjugated diene block copolymer wherein at least one functional group is grafted to the block copolymer primarily in the vinyl aromatic block. Examples of such modified block copolymers are described in U.S. patent application Ser. No. 766,217, filed Aug. 16, 1985, which is incorporated herein by reference. Said patent application describes the preparation of a modified block copolymer by metalation, a process which does not require a base polymer with an undesirably high level of residual unsaturation.

More particularly, there is provided an impact resistant polymeric composition comprising (a) from 50 to 97 percent by weight of a thermoplastic polyester; and (b) from 3 to 50 percent by weight of a functionalized selectivity hydrogenated block copolymer of the formula $B_n(AB)_oA_p$ where $n=0,1$, $o=1,2 \ldots$ ; $p=0,1$ to which has been grafted at least one electrophilic graftable molecule or electrophile wherein substantially all of said graftable molecules are grafted to the block copolymer in the vinylarene block.

DETAILED DESCRIPTION OF THE INVENTION

Thermoplastic Polyesters

The thermoplastic polyesters employed in this invention have a generally crystalline structure, a melting point over about 120° C., and are thermoplastic as opposed to thermosetting.

One particularly useful group of polyesters are those thermoplastic polyesters prepared by condensing a dicarboxylic acid or the lower alkyl ester, acid halide, or anhydride derivatives thereof with a glycol, according to methods well-known in the art.

Among the aromatic and aliphatic dicarboxylic acids suitable for preparing polyesters useful in the present invention are oxalic acid, malonic acid, succinic acid, glutaric acid, adipic acid, suberic acid, azelaic acid, subacic acid, terephthalic acid, isophthalic acid, p-carboxyphenoacetic acid, p,p'-dicarboxydiphenyl, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p,p'-dicarboxydiphenylpropane, p,p'-dicarboxydiphenyloctane, 3-alkyl-4-(β-carboxyethoxy)-benzoic acid, 2,6-naphthalene dicarboxylic acid, 2,7-naphthalene dicarboxylic acid, and the like. Mixtures of dicarboxylic acids can also be employed. Terephthalic acid is particularly preferred.

The glycols suitable for preparing the polyesters useful in the present invention include straight chain alkylene glycols of 2 to 12 carbon atoms such as ethylene glycol, 1,3-propylene glycol, 1,6-hexylene glycol, 1,10-decamethylene glycol, 1,12-dodecamethylene glycol and the like. Aromatic glycols can be substituted in whole or in part. Suitable aromatic dihydroxy compounds include p-xylylene glycol, pyrocatechol, resorcinol, hydroquinone, or alkyl-substituted derivatives of these compounds. Another suitable glycol is 1,4-cyclohexane dimethanol. Much preferred glycols are the straight chain alkylene glycols having 2 to 4 carbon atoms.

A preferred group of polyesters are poly(ethylene terephthalate), poly(propylene terephthalate), and poly(butylene terephthalate). A much preferred polyester is poly(butylene terephthalate). Poly(butylene terephthalate), a crystalline copolymer, may be formed by the polycondensation of 1,4-butanediol and dimethylterephthalate or terephthalic acid, and has the generalized formula:

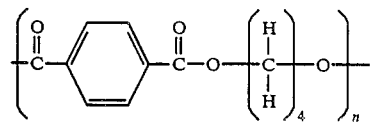

where n varies from 70 to 140. The molecular weight of the poly(butylene terephthalate) typically varies from about 20,000 to about 25,000. A suitable process for manufacturing the polymer is disclosed in British Pat. No. 1,305,130.

Commercially available poly(butylene terephthalate) is available from General Electric under the tradename VALOX ® thermoplastic polyester. Other commercial polymers include CELANEX ® from Celanese, TENTITE ® from Eastman Kodak, and VITUF ® from Goodyear Chemical.

Other useful polyesters include the cellulosics. The thermoplastic cellulosic esters employed are widely used as molding, coating and film-forming materials and are well known. These materials include the solid thermoplastic forms of cellulose nitrate, cellulose acetate (e.g. cellulose diacetate, cellulose triacetate), cellulose butyrate, cellulose acetate butyrate, cellulose propionate, cellulose tridecanoate, carboxymethyl cellulose, ethyl cellulose, hydroxyethyl cellulose and acetylated hydroxyethyl cellulose as described on pages 25-28 of Modern Plastics Encyclopedia, 1971-72, and references listed therein.

Another useful polyester is polypivalolactone. Polypivalolactone is a linear polymer having recurring ester structural units mainly of the formula:

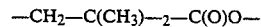

i.e., units derived from pivalolactone. Preferably, the polyester is a pivalolactone homopolymer. Also incuded, however, are the copolymers of pivalolactone with not more than 50 mole percent, preferably not more than 10 mole percent of other beta-propiolactones, such as beta-propiolactone, alpha, alpha-diethyl-beta-propiolactone and alpha-methyl-alpha-ethyl-beta-propiolactone. The term "beta-propiolactones" refers to beta-propiolactone (2-oxetanone) and to derivatives thereof which carry no substituents at the beta-carbon atom of the lactose ring. Preferred beta-propiolactones are thos containing a tertiary or quaternary carbon atom in the alpha position relative to the carbonyl group. Especially preferred are the alpha, alpha-dialkyl-beta-propiolactones wherein each of the alkyl groups independently has from one to four carbon atoms. Examples of useful monomers are:

alpha-ethyl-alpha-methyl-beta-propiolactone,
alpha-methyl-alpha-isopropyl-beta-propiolactone,
alpha-ethyl-alpha-n-butyl-beta-propiolactone,
alpha-chloromethyl-alpha-methyl-beta-propiolactone,
  alpha, alpha-bis-(chloromethyl)-beta-propiolacetone, and
alpha, alpha-dimethyl-beta-propiolacetone (pivalolacetone).

See generally U.S. Pat. Nos. 3,259,607; 3,299,171; and 3,579,489. These polypivalolactones have a molecular weight in excess of 20,000 and a melting point in excess of 120° C.

Another useful polyester is polycaprolacetone. Typical poly($\epsilon$-caprolacetones) are substantially linear polymers in which the repeating unit is

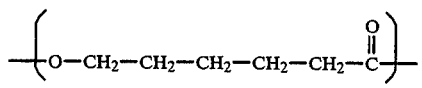

These polymers have similar properties to the polypivalolactones and may be prepared by a similar polymerization mechanism. See generally U.S. Pat. No. 3,259,607.

Linear and branched polyesters and copolyesters of glycols and terephthalic or isophthalic acid have been commercially available for a member of years and have been described by Whinfield et al in U.S. Pat. No. 2,465,319 and by Pengilly in U.S. Pat. No. 3,047,539.

Thermoplastic polyesters such as PBT and PET are useful as injection moldable materials which can be formed into articles which exhibit a good balance of properties including strength and stiffness. An improvement in impact strength of these materials is desirable, however.

Modified Block Copolymers

The modified block copolymers according to the present invention are grafted or substituted in the vinylarene block as shown in the exemplary reactions given below:

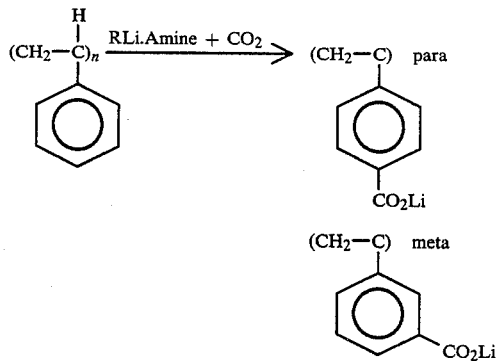

Where: RLi=Alkyl Lithium

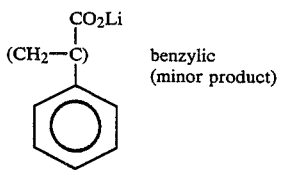

The structure of the substituted block copolymer specifically determined by the location of the functionality on the polymer backbone in the vinylarene block gives the block copolymer a substantially greater degree of thermal stability.

Selectively Hydrogenated Block Copolymer Base Polymer

Block copolymers of conjugated dienes and vinyl aromatic hydrocarbons which may be utilized include any of those which exhibit elastomeric properties and those which have 1,2-microstructure contents prior to hydrogenation of from about 7% to about 100%. Such block copolymers may be multiblock copolymers of varying structures containing various ratios of conjugated dienes to vinyl aromatic hydrocarbons including those containing up to about 60 percent by weight of vinyl aromatic hydrocarbon. Thus, multiblock copolymers may be utilized which are linear or radial symmetric or asymmetric and which have structures represented by the formulae A—B, A—B—A, A—B—A—B, B—A, B—A—B, B—A—B—A, (AB)$_{0,1,2...}$BA and the like wherein A is a polymer block of a vinyl aromatic hydrocarbon or a conjugated diene/vinyl aromatic hydrocarbon tapered copolymer block and B is a polymer block of a conjugated diene.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356 the disclosures of which are incorporated herein by reference.

Conjugated dienes which may be utilized to prepare the polymers and copolymers are those having from 4 to 8 carbon atoms and include 1,3-butadiene, 2-methyl-1,3-butadiene (isoprene), 2,3-dimethyl-1,3-butadiene, 1,3-pentadiene, 1,3-hexadiene, and the like. Mixtures of such conjugated dienes may also be used. The preferred conjugated diene is 1,3-butadiene.

Vinyl aromatic hydrocarbons which may be utilized to prepare copolymers include styrene, o-methylstyrene, p-methylstyrene, p-tert-butylstyrene, 1,3-dimethylstyrene, alpha-methylstyrene, vinylnaphthalene, vinylanthracene and the like. The preferred vinyl aromatic hydrocarbon is styrene.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process. The hydrogenation of these polymers and copolymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual unsaturation content in the polydiene block of from about 0.5 to about 20 percent of their original unsaturation content prior to hydrogenation.

Graftable Compounds

In general, any materials having the ability to react with the base polymer, are operable for the purposes of this invention.

In order to incorporate functional groups into the base polymer, monomers capable of reacting with the base polymer are necessary. Monomers may be polymerizable or nonpolymerizable, however, preferred monomers are nonpolymerizable or slowly polymerizing.

The class of preferred electrophiles which will form graft polymers within the scope of the present invention include reactants from the following groups carbon dioxide, ethylene oxide, aldehydes, ketones, carboxylic acids, salts, there esters and halides, epoxides, sulfur, boron alkoxides, isocyanates and various silicon compounds.

These electrophiles may contain appended functional groups as in the case of N,N-dimethyl-p-amino benzaldehyde where the amine is an appended functional group and the aldehyde is the reactive electrophile. Alternatively, the electrophile may react to become the functional site itself; as an example, carbon dioxide (electrophile) reacts with the metalated polymer to form a carboxylate functional group. By these routes, polymers could be prepared containing grafted sites selected from one or more of the following groups of functionality type carboxylic acids, their salts and esters, ketones, alcohols and alkoxides, amines, amides, thiols, borates, and functional groups containing a silicon atom.

These functionalities can be subsequently reacted with other modifying materials to produce new functional groups. For example, the grafted carboxylic acid described above could be suitably modified by esterifying the resulting acid groups in the graft by appropriate reaction with hydroxy-containing compounds of varying carbon atoms lengths. In some cases, the reaction could take place simultaneously with the grafting process but in most examples it would be practiced in subsequent post modification reaction.

The grafted polymer will usually contain from 0.02 to 20, preferably 0.1 to 10, and most preferably 0.2 to 5 weight percent of grafted portion.

The block copolymers, as modified, can still be used for any purpose for which an unmodified material (base polymer) was formerly used. That is, they can be used for adhesives and sealants, or compounded and extruded and molded in any convenient manner.

Preparation of the Modified Block Copolymers

The polymers may be prepared by any convenient manner one of which is described in copending U.S. application Ser. No. 766,622, filed Aug. 12, 1985, now abondoned, which is herein incorporated by reference.

An example of a method to incorporate functional groups into the base polymer primarily in the vinylarene block is metalation.

Metalation is carried out by means of a complex formed by the combination of a lithium component which can be represented by $R'(Li)_x$ with a polar metalation promoter. The polar compound and the lithium component can be added separately or can be premixed or pre-reacted to form an adduct prior to addition to the solution of the hydrogenated copolymer. In the compounds represented by $R'(Li)_x$, the $R'$ is usually a saturated hydrocarbon radical of any length whatsoever, but ordinarily containing up to 20 carbon atoms, and can be aromatic radical such as phenyl, napthyl, tolyl, 2-methylnaphthyl, etc., or a saturated cyclic hydrocarbon radical of e.g. 5 to 7 carbon atoms, a monounsaturated cyclic hydrocarbon radical of 5 to 7 carbon atoms, an unconjugated, unsaturated aliphatic hydrocarbon radical of 1 to 20 carbon atoms, or an alkyllithium having one or more aromatic groups on the alkyl group, the alkyl group containing 1 to 20 carbon atoms. In the formula, $R'(Li)_x$ x is an integer of 1 to 3. Representation species include, for example: methyllithium, isopropyllithium, sec-butyllithium, n-butyllithium, t-butyllithium, n-dodecyllithium, 1,4-dilithiobutane, 1,3,5-trilithiopentane, and the like. The lithium alkyls must be more basic than the product metalated alkyl. Of course, other alkali metal or alkaline earth metal alkyls could be used but the lithium alkyls are preferred due to their ready commercial availability. In a similar way, metal hydrides could be employed as the metalation reagent but the hydrides have only limited solubility in the appropriate solvents. Therefore, the metal alkyls are preferred and their greater solubility which makes them easier to process.

Lithium compounds alone usually metalate copolymers containing aromatic and olefinic functional groups with considerable difficulty and under high temperatures which may tend to degrade the copolymer. However, in the presence of tertiary diamines and bridgehead monoamines, metalation proceeds rapidly and smoothly. Some lithium compounds can be used alone effectively, notably the methyllithium types.

It has been shown that the metalation occurs at a carbon to which an aromatic group is attached, or in an aromatic group, or in more than one of these positions. In any event, it has been shown that a very large number of lithium atoms are positioned varously along the polymer chain, attached to internal carbon atoms away from the polymer terminal carbon atoms, either along the backbone of the polymer or on groups pendant therefrom, or both, in a manner depending upon the distribution of reactive or lithiatable positions. This distinguishes the lithiated copolymer from simple terminally reactive polymers prepared by using a lithium or even a polylithium initiator in polymerization thus limiting the number and the location of the positions available for subsequent attachment. With the metalation procedure described herein, the extent of the lithiation will depend upon the amount of metalating agent used and/or the groups available for metalation. The use of a more basic lithium alkyl such as tert-butyllithium alkyl may not require the use of a polar metallation promoter.

The polar compound promoters include a variety of tertiary amines, bridgehead amines, ethers, and metal alkoxides.

The tertiary amines useful in the metalation step have three saturated aliphatic hydrocabon groups attached to each nitrogen and include, for example:

(a) Chelating tertiary diamines, preferably those of the formula $(R^2)_2N—C_yH_{2y}—N(R^2)_2$ in which each $R^2$ can be the same or different straight- or branched-chain alkyl group of any chain length containing up to 20 carbon atoms or more all of which are included herein and y can be any whole number from 2 to 10, and particularly the ethylene diamines in which all alkyl substituents are the same. These include, for example: tetramethylethylenediamine, tetraethylethylenediamine, tetradecylenediamine, tetraoctylhexyienediamine, tetra-(mixed alkyl) ethylene diamines, and the like.

(b) Cyclic diamines can be used, such as, for example, the N,N,N',N'-tetraalkyl 1,2-diamino cyclohexanes, the N,N,N',N'-tetraalkyl 1,4-diamino cyclohexanes, N,N'-dimethylpiperazine, and the like.

(c) The useful bridgehead diamines include, for example, sparteine, triethylenediamine, and the like.

Tertiary monoamines such as triethylenediamine are generally not as effective in the lithiation reaction. However, bridgehead monoamines such as 1-azabicyclo[2.2.2]octane and its substituted homologs are effective.

Ethers and the alkali metal alkoxides are presently less preferred than the chelating amines as activators for the metalation reaction due to somewhat lower levels of incorporation of functional group containing compounds onto the copolymer backbone in the subsequent grafting reaction.

In general, it is most desirable to carry out the lithiation reaction in an inert solvent such as saturated hydrocarbons. Aromatic solvents such as benzene are lithiatible and may interfere with the desired lithiation of the hydrogenated copolymer. The solvent/copolymer weight ratio which is convenient generally is in the range of about 5:1 to 20:1. Solvents such as chlorinated hydrocarbons, ketones, and alcohols, should not be used because they destroy the lithiating compound.

Polar metalation promoters may be present in an amount sufficient to enable metalation to occur, e.g. amounts between 0.03 and 100 or more preferably between 0.1 to about 10 equivalents per equivalent of lithium alkyl.

The equivalents of lithium employed for the desired amount of lithiation generally range from such as about 0.001-3 per vinyl arene unit in the copolymer, presently preferably about 0.01-1.0 equivalents per vinyl arene unit in the copolymer to be modified. The molar ratio of active lithium to the polar promoter can vary from such as 0.01 to 10.0. A preferred ratio is 0.5.

The amount of alkyl lithium employed can be expressed in terms of the Li/vinylarene molar ratio. This ratio may range from a value of 1 (one lithium alkyl per vinylarene unit) to as low as $1 \times 10^{-3}$ (1 lithium alkyl per 1000 vinylarene units).

The process of lithiation can be carried out at temperatures in the range of such as about $-70°$ C. to $+150°$ C., presently preferably in the range of about 25° C. to 60° C., the upper temperatures being limited by the thermal stability of the lithium compounds. The lower temperatures are limited by considerations of production cost, the rate of reaction becoming unreasonably slow at low temperatures. The length of time necessary to complete the lithiation and subsequent reactions is largely dependent upon mixing conditions and temperature. Generally the time can range from a few seconds to about 72 hours, presently preferably from about 1 minute to 1 hour.

Grafting Step

The next step in the process of preparing the modified block copolymer is the treatment of the lithiated hydrogenated copolymer, in solution, without quenching in any manner which would destroy the lithium sites, with a species capable of reacting with a lithium anion. These species must contain functional groups capable of undergoing nucleophilic attack by a lithium anion. Such species contain functional groups including but not limited to

| | | | |
|---|---|---|---|
| $\overset{O}{\underset{\|}{-C-O-}}$ | carboxyl | $C-NR_2$ | Amine |
| $C-OH$ | hydroxyl | $\overset{O}{\underset{\|}{C-NR_2}}$ | Amide |
| $C-OR$ | ether | $C-SH$ | Thiol |
| $\overset{O}{\underset{\|}{-C-R}}$ | ketone | $C-B(OR)_2$ | Borane Containing |
| $\overset{O}{\underset{\|}{-C-H}}$ | aldehyde | $C-\underset{\|}{\overset{\|}{Si}}-$ | Silicon Containing |

The process also includes further chemistry on the modified block copolymer. For example, converting of a carboxylic acid salt containing modified block copolymer to the carboxylic acid form can be easily accomplished.

Preparation of the Final Compositions

The toughened compositions of this invention can be prepared by melt blending, in a closed system, a polyester and at least one modified block copolymer into a uniform mixture in a multi-screw extruder such as a Werner Pfleiderer extruder having generally 2–5 kneading blocks and at least one reverse pitch to generate high shear, or other conventional plasticating devices such as a Brabender, Banbury mill, or the like. Alternatively, the blends may be made by coprecipitation from solution, blending or by dry mixing together of the components followed by melt fabrication of the dry mixture by extrusion.

The polyester blends of the present invention may be prepared by melt-blending from about 50 percent to about 97 percent by weight preferably from about 70 percent to about 95 percent or more preferably 75 percent to about 90 percent of the polyester and from about 3 percent to about 50 percent by weight preferably from about 5 percent to about 30 percent or more preferably 10 percent to about 25 percent functionalized block copolymer.

The compositions of the invention may be modified by one or more conventional additives such as stabilizers and inhibitors of oxidative, thermal, and ultraviolet light degradation; lubricants and mold release agents, colorants including dyes and pigments, fibrous and particulate fillers and reinforcements, nucleating agents, plasticizers, etc.

The stabilizers can be incorporated into the composition at any stage in the preparation of the thermoplastic composition. Preferably the stabilizers are included early to preclude the initiation of degradation before the composition can be protected. Such stabilizers must be compatible with the composition.

It is to be understood that in the specification and claims herein, unless otherwise indicated, when in connection with melt-blending, the amount of the polyester or block copolymer is expressed in terms of percent by weight it is meant percent by weight based on the total amount of these materials which is employed in the melt-blending.

To assist those skilled in the art in the practice of this invention, the following Examples are set forth as illustrations, parts and percentages being by weight unless otherwise specifically noted. The molded bars were tested using the following test procedures in the dry-as-molded state:

Notched Izod toughness: at each end ASTM D-256-56

EXAMPLE 1

Preparation of Modified Block Copolymer

The base polymer used was a styrene-ethylene/butylene-styrene block copolymer which contained 29 wt% styrene and had a molecular weight of 66,000. 2270 gm of this polymer were dissolved in 15 gallons of cyclohexane. This mixture was placed in a 20 gallon stainless steel pressurized reaction vessel and pressurized to about 25 psi. 0.8 meq/gm polymer of tetramethylethylene diamine was then added to the vessel. A small amount, 0.5 ml, of 1-1 diphenylethylene (an indicator) was then added to the reactor. Sec-butyllithium was then added incrementally until a yellow color was obtained, indicating the absence of impurities.

The reactor contents were then heated to 60° C. Next, 0.4 meq/gm polymer of additional sec-butyllithium was added to the reactor. After 2½ hours reaction time, the contents of the vessel were transferred to another vessel which contained a stirring mechanism. The second vessel contained 2-3 lbs. of dry ice (solid $CO_2$), 10 gallons of tetrahydrofuran, and 5 gallons of diethylether. The solution was stirred for 30 minutes. Next, 85 grams of acetic acid in an isopropanol solution was added to the reactor. This solution was stirred for 16 hours. The modified block copolymer was then recovered by steam stripping.

Infrared analysis of the polymer showed the presence of both bound carboxylic acid at 1690 cm$^{-1}$ and bound lithium carboxylate salt at 1560–1600 cm$^{-1}$. By colorimetric titration with 0.01N KOH in methanol using a phenothalein indicator, it was found that the level of bound acid was 0.3 wt% COOH. After repeated washings of the polymer with alcoholic hydrochloric acid, infrared showed that complete conversion of salt to acid took place. Titration of the washed polymer gave a bound acid level of 0.4 wt% COOH.

EXAMPLE 2

The thermoplastic polyester used in this example was a commercial PBT, Valox 310, a molding grade obtained from General Electric. Prior to all processing steps, PBT and its blends were dried at 120° C. for 4 hours under vacuum with a nitrogen purge.

Blends of PBT with both unmodified and modified block copolymer were prepared in a 30 mm diameter corotating twin screw extruder. The blend components were premixed by tumbling in polyethylene bags, and then fed into the extruder. The extruder melt temperature profile varied from 230° C. in the feed zone to 240° C. at the die. A screw rpm of 300 was used. The extrudate was pelletized and injection molded into test specimens. The formulations and physical properties are shown in Table 1.

TABLE 1

| Composition (parts by weight) | 1 | 2 | 3 | 4 | 5 | 6 | 7 |
|---|---|---|---|---|---|---|---|
| PBT | 100 | 90 | 80 | 70 | 90 | 80 | 70 |
| Unmodified Block Copolymer | — | 10 | 20 | 30 | — | — | — |
| Modified Block Copolymer | — | — | — | — | 10 | 20 | 30 |
| ⅛" Room Temperature Notched Izod (ft. lb./in.) | 0.7 | 0.9 | 1.4 | 1.7 | 2.0 | 19.9 | 21.5 |

The above example shows that the compositions according to this invention exhibit an unexpected improvement in impact strength over the thermoplastic polyester or blends of the thermoplastic polyester with unmodified block copolymer.

The foregoing embodiments are intended to illustrate but not to limit the invention. Various modifications can be made in the invention without departing from the spirit and scope.

What is claimed is:

1. Impact resistant polymeric composition comprising:
   (a) from 50 to 97 percent by weight of a thermoplastic polyester; and
   (b) from 3 to 50 percent by weight of a functionalized selectively hydrogenated block copolymer of the formula $B_n(AB)_oA_p$ where n=0 or 1, o≧1, p=0 or 1, each A is predominantly a polymerized vinyl aromatic hydrocarbon block and, each B prior to hydrogenation is predominantly a polymerized conjugated diene hydrocarbon block, to which has been grafted at least one graftable functional molecule selected from the group consisting of an electrophilic graftable molecule containing a functional group and an electrophile, wherein substantially all of said electrophilic graftable molecules or electrophiles are grafted to the block copolymer in the vinyl aromatic hydrocarbon block.

2. The composition of claim 1 containing said block copolymer wherein:
   (1) each A is predominantly a polymerized vinyl aromatic hydrocarbon block having an average molecular weight of about 500 to 115,000;
   (2) each B prior to hydrogenation is predominantly a polymerized conjugated diene hydrocarbon block having an average molecular weight of about 20,000 to 450,000;
   (3) the blocks A constituting 1-95 weight percent of the copolymer;
   (4) the unsaturation of the block B is less than 10% of the original unsaturation; and
   (5) the unsaturation of the A blocks is above 50% of the original unsaturation.

3. The composition of claim 1 wherein the block copolymer is a styrene-ethylene/butylene-styrene block copolymer.

4. The composition of claim 1 wherein the blocks A comprise 1–40 percent by weight of the copolymer, the unsaturation of block B is reduced to less than 5% of its original value and the average unsaturation of the hydrogenated block copolymer is reduced to less than 20% of its original value.

5. The composition of claim 4 wherein A is a polymerized styrene block having an average molecular weight of between about 500 and 60,000

6. The composition of claim 1 wherein B is a polymerized butadiene block having an average molecular weight of between about 35,000 and 150,000, 35%–50% of the condensed butadiene units having 1,2-configuration.

7. The composition of claim 6 wherein the unsaturation of block B has been reduced by hydrogenation to less than 10% of its original value.

8. The composition of claim 1 wherein an average of less than about 10% of the vinyl aromatic hydrocarbon units are hydrogenated.

9. The composition of claim 1 wherein an average of more than about 25% of the vinyl aromatic hydrocarbon units are hydrogenated.

10. The composition of claim 1 wherein said graftable functional molecule is an electrophile and said electrophile is carbon dioxide.

11. The composition of claim 1 wherein said graftable functional molecule is an electrophile and said electrophile is ethylene oxide.

12. The composition of claim 1 wherein said graftable functional molecule is an electrophile and said electrophile is selected from the group consisting of aldehydes, ketones and acid salts and esters.

13. The composition of claim 1 wherein said graftable functional molecule is an electrophile and said electrophile is an epoxide.

14. The composition of claim 1 wherein said graftable functional molecule is an electrophile and said electrophile is sulphur.

15. The composition of claim 1 wherein said graftable functional molecule is an electrophile and said electrophile is a boron alkoxide.

16. The composition of claim 1 wherein said graftable functional molecule is an electrophile and said electrophile is an isocyanate.

17. The composition of claim 1 wherein said graftable functional molecule is an electrophile and said electrophile is a molecule containing silicon.

18. The composition of claim 1 wherein said graftable functional molecule is an electrophile and said electrophile is a sulfonate.

19. The composition of claim 1 wherein the functional groups are carboxylic acids, their salts and esters.

20. The composition of claim 1 wherein the functional groups are ketones.

21. The composition of claim 1 wherein the functional groups are alcohols and alkoxides.

22. The composition of claim 1 wherein the functional groups are amines.

23. The composition of claim 1 wherein the functional groups are functional groups containing a silicon atom.

24. The composition of claim 1 wherein the functional groups are thiols.

25. The composition of claim 1 wherein the functional groups are borates.

26. The composition of claim 1 wherein the functional groups are amides.

27. The composition of claim 1 wherein the grafted molecule or its derivative is present in the functionalized block copolymer at between about 0.02–20 weight percent.

28. The composition of claim 1 wherein the grafted molecule or its derivative is present in the functionalized block copolymer at between about 0.1–10 weight percent.

29. The composition of claim 1 wherein the grafted molecule or its derivative is present in the functionalized block copolymer at between about 0.2–5 weight percent.

30. The composition of claim 1 wherein the polyester is present at between about 70 and about 95 percent by weight.

31. The composition of claim 1 wherein the polyester is present at between about 75 and about 90 percent by weight.

32. The composition of claim 1 wherein the polyester is polybutylene terephthalate.

33. The composition of claim 1 wherein the polyester is polyethylene terephthalate.

34. The composition of claim 1 wherein the polyester is present at between 60 and 90 percent by weight and the block copolymer is present at between 10 and 40 percent by weight.

* * * * *